United States Patent Office 3,355,359
Patented Nov. 28, 1967

3,355,359
PROCESS FOR PRODUCING L-GLUTAMIC ACID BY USING CORYNEBACTERIUM MELASSECOLA
Tetsukazu Goto, Shuichi Nishio, and Hiroshige Kojima, Nobeoka-shi, Takatsugu Kawano, Yokohama-shi, and Shiro Hayakawa and Hitoshi Araki, Tokyo, Japan, assignors to Asahi Kasei Kogyo Kabushikikaisha, Osaka, Japan
No Drawing. Filed July 12, 1965, Ser. No. 471,438
Claims priority, application Japan, July 18, 1964, 39/40,477
28 Claims. (Cl. 195—29)

ABSTRACT OF THE DISCLOSURE

A process for producing L-glutamic acid by using bacteria, and more particularly the invention concerns a process for producing L-glutamic acid comprising inoculating the microbes belonging to the species Corynebacterium melassecola into a culture medium containing carbohydrate material, nitrogen source and inorganic salts, cultivating said microbes under submerged aerobic conditions, in the presence of a compound selected from the group consisting of surface active agents and antibiotics and recovering the thus produced L-glutamic acid therefrom.

DESCRIPTION OF THE PRIOR ART

Various studies have been reported on the manufacture of L-glutamic acid by using microbes belonging to such genera as Microbacterium, Brevibacterium, Corynebacterium and Micrococcus and the like. However, these microbes are all selected because they are adapted for use in a culture medium containing glucose as the main carbon source, and therefore they are not always suitable for use in an organic nutrient culture medium such as one containing molasses.

SUMMARY OF THE INVENTION

The principal object of the invention is to provide a practical, economic process for producing L-glutamic acid by using molasses known as a cheap carbohydrate source. The inventors have employed a culture medium containing molasses and, as hereinafter described, isolated microbes having a remarkable ability to produce L-glutamic acid in this medium. These new microbes were designated by the present inventors as "Corynebacterium melassecola."

DESCRIPTION OF THE PREFERRED EMBODIMENT

Corynebacterium molassecola employed in the method of this invention having a strong ability for metabolizing molasses into L-glutamic acid was isolated from soils and/or drains by using a screening culture medium of the following composition.

Screening culture medium:                G./dl.
  Beet sugar waste molasses (as 100%
    sugar) _____ about 7.0
  Urea _____ about 1.5
  $KH_2PO_4$ _____ about 0.2
  $(NH_4)_2SO_4$ _____ about 0.1
  $MgSO_4 \cdot 7H_2O$ _____ about 0.05
  Nonion S–6 [1] _____ about 0.13

[1] Nonionic surface active agent made by Nippon Yushi Co.; polyoxyethylene monostearate.

75 ml. of this medium was placed in a 500 ml. Sakaguchi flask, sterilized, inoculated with bacterium previously cultured in an ordinary Bouillon slant and culturing was effected at 30° C. for 60 hours under shaking. The bacteriological properties of the Corynebacterium melassecola employed in the method of this invention are described in detail hereinbelow, according to "Manual of Microbiological Methods by the Society of American Bacteriologist" (1957).

(A) Microscopic view (Bouillon agar; cultured at 30° C. for 1–3 days):

(1) Appearance: Observation by microscope showed all to be round edged rod types of different sizes and in various arrangements such as V-shape arrangement, due to snapping division, and palisade arrangement. However, some of them were independent, and no linear chains were found. The average size was around 0.8~1.0 x 0.8~2.0µ, but in some strains they were about 0.5~0.8 x 0.5~1.8µ. Some had a width of 0.8~1.0µ and a length of 2~5µ.

(2) Flagellum (Dyed: Electro-microscopic view): Not observed.
(3) Spore: Not observed.
(4) Gram staining: Positive.
(5) Methachromatic granules: Observed.
(6) Acid-fast staining: Negative.
(7) Motility (Semi-fluid agar method, Claigy's method etc.): None.

(B) Cultivation view (at 30° C., for 1–2 days and more in some cases)

(1) Colony view on Bouillon agar plain: The colony size was around 1 mm. in diameter after 1 day and 1–2 mm. after 2 days. It was a regular circle having a complete, and somewhat protruded edge. The colony was a flat, brilliant and opaque plane and had an orange color. (Some strains had a yellow color.)

(2) Agar slant: Bacteria were grown in a linear form along an inoculated line. Fair growing, no odor and no coloration were observed.

(3) Agar stab culture: Bacterial growing was found only in the vicinity of its surface and only in linear form.

(4) Liquid Bouillon medium: The liquid was uniformly clouded, and a ring-shape colony was found on the surface thereof. Bacterial membrane was found in some strains.

(5) Thioglycolate medium: Excellent growing was found only on the surface of the medium.

(6) Roffler's serum medium: Excellent growing was observed.

(7) Blood agar medium: Excellent growing was observed, but said bacterium had no hemolytic activity.

(C) Physiological properties (cultured at 30° C.)

(1) Oxygen requirement: Aerobic.
(2) Growing pH: At around pH 5.5–10.
(3) Growing temperature: 25–37° C.; no growth at 45° C.
(4) Heat resistance (10% skim milk): Not resist at 75° C. for 15 minutes or 70° C. for 30 minutes, but resist at 55° C. for about 15 minutes.
(5) Voger Proskauer's Reaction: Negative.
(6) Methyl red test: Positive.
(7) Nitrate reducing ability: Positive.
(8) Hydrogen sulfide productivity: Negative.
(9) Indol productivity: Negative.
(10) Citric acid utilization: Negative.
(11) Gelatin liquefaction: Negative.
(12) Starch liquefaction: Negative.
(13) Litmus milk: No change.
(14) Urease: Positive.
(15) Catalase: Positive.
(16) Methylene blue reduction: Positive.

(17) Cellulose: Negative.

(18) Acid formation from various carbohydrates: Acid formation was observed on each of the following hydrocarbons:

Glucose, fructose, galactose, mannose, sucrose, maltose, and trehalose.

No acid was obtained from the following:

arabinose, rhamnose, xylose, lactose, melibiose, cellobiose, raffinose, meleditose, starch, inulin, dextrin, glycogen, glycerol, adonitol, mannitol, sorbitol, dulcitol, salicin and aesculin.

(19) Gas formation from various carbohydrates: Negative.

(20) Anaerobic decomposition of glucose (Rayfson's method): Negative.

(21) Biotin requirement: Required for their growth.

(D) *Pathogenic effect*

No pathogenic effect was observed in guinea pig and mouse by subcutaneous and intraperitoneal injections.

The above said properties are all of the strain ASB-4821 being kept by the inventors as a typical strain of *Corynebacterium melassecola*. This strain has been deposited with the American Type Culture Collection where its deposit number is ATCC 17966. There are of course many other strains which are somewhat different therefrom, but the difference is not sufficient to exclude them from the conception of the same species, such as, for example, AS-B 1285 (ATCC 17965), AS-B 4820, AS-B 4680, AS-B 13599, AS-B 2208 and AS-B 1910. According to the classification system described in the "Bergey's Manual of Determinative Bacteriology," 7th edition, above said bacteriological properties were analyzed to determine the right position of the bacterium in the known classification chart. Judging from the characteristic points such as having stiff rod form, making no chain, making no trichrome, containing no photosynthesis chromatophore, having positive gram staining, giving no spore, having heterotrophic, aerobic, positive catalase activity, and negative acid fast staining, the present bacterium was roughly classified in either family, Brevibacteriaceae or Corynebacteriaceae, Eubacteriales Order of Schizomycetes class. Final determination of the exact family, to which the bacterium of this invention should be belonged, was conducted as following. The so-called "Branching" and "Pleomorphism," each factor being described as a classification standard in said Bergey's classification manual, were studied in detail. In the manual, it is stated that Branching is not found in Brevibacteriaceae, while some of Corynebacteriaceae may have them. On the other hand, the bacterium of the present invention does not possess such a branching, though some of the strains have the so-called budding appearance. Therefore, it is impossible to fix said bacterium in Corynebacteriumceae only on the basis of Branching characteristics thereof. For this purpose, both Branching and Pleomorphism should be employed as the key points in classifying the bacterium in either of said families. As for the pleomorphism, the present bacterium is clearly judged as "positive," by general experimental procedures. However, a judgment based on observation with the naked eye is subjective view and may vary slightly depending on the observer. Consequently, the most suitable culture medium for the determination of pleomorphism, for example, lithium chloride culture medium as described in "Determinative Bacteriology" by Thomas Harold (1960), was employed in the test and characteristic pleomorphism of the present bacterium was clearly found therewith. These methods were also applied to the known strains belonging to Corynebacteriaceae and Brevibacteriaceae, these strains on deposit with the American Type Culture Collection, and the reliability of these methods for classifying said two species was confirmed thereby. Thus, the bacterium of the present invention was finally determined as Corynebacterium. As for the genus of Corynebacteriaceae, the following six genera are described in a common text book: Corynebacterium genus, Listeria genus, Erysipelothrix genus, Microbacterium genus, Cellulomonas genus, Arthrobactero genus.

Therefore, the next studies were directed to determine the relevant position of the present bacterium among these genera. Since the bacterium did not possess the motility and pathogenic property characteristic of Listeria genus, this particular genus was omitted. Erysipelothrix was also excluded because the present bacterium differs therefrom in catalase activity, arrangement of bacteria, and oxygen requirement and the like. Microbacterium was then omitted because of its attitude in heat resistance in skim milk. Considering such factors as ability to decompose cellulose, a specific life cycle, change in susceptibility to Gram staining with the cultivation age, it was determined that the present bacterium does not belong to Cellulomonas or Arthrobactor genera. Thus, the bacterium was finally classified as Corynebacterium. However, when the characteristics of the present bacterium were compared with those of a known Corynebacterium as described in said Bergey's Classification Manual, with the conception of species, no indentical one seemed to be there in said genus. Furthermore, the present bacterium was compared with such strains as newly discovered and classified in the above said genus, their comparative data being shown in Table 1, but no identical one could be found therein. Therefore, it must be a new species being not listed in the Bergey's manual, and the inventors have named this new bacterium as *Corynebacterium melassecola*.

TABLE 1.—COMPARISON OF THE NEW BACTERIUM WITH THE KNOWN STRAINS OF CORYNEBACTERIUM FROM THE PHYSIOLOGICAL POINT OF VIEW (1) Comparison With *Corynebacterium acetoacidophilum*

|  | Corynebacterium acetoacidophilum | Corynebacterium melassecola |
| --- | --- | --- |
| Methyl red reaction | Negative | Positive. |
| Nitrate reducing ability | do | Do. |
| Litmus milk | Change to a very weak alkaline condition. | No change. |
| Galactose utilization |  |  |

(2) Comparison With *Corynebacterium herculis* ATCC 13868

|  | Corynebacterium herculis | Corynebacterium melassecola |
| --- | --- | --- |
| Hydrogen sulfide production | + | —. |
| Litmus milk | Change to an alkaline condition. | No change. |
| Dextrin | ± | —. |
| Maltose | ± | +. |
| Arabinose | + | —. |
| Vitamin B₁ requirement | + | —. |

(3) Comparison With *Corynebacterium lilium* NRRL B-2243

| + | Corynebacterium lilium | Corybacterium melassecola |
| --- | --- | --- |
| Gram staining reaction of broth growing strain. | — ⟶ + | Always positive. |
| Methyl red test | Doubtful | +. |
| Litmus milk | Change to an alkaline after 25 days. | No change. |
| Citric acid utilization | ± | —. |
| Sugar utilization: |  |  |
| Galactose | ± | +. |
| Trehalose | — ⟶ + | +. |
| Mannitol | ± | —. |
| Inulin | ± | —. |
| Inositol | ± | —. |

(4) Comparison With *Corynebacterium carnae* NRRL B-2244

|  | Corynebacterium carnae | Corynebacterium melassecola |
|---|---|---|
| Gram staining of broth growing strain | − ⟶ + | Always positive. |
| Litmus milk | Change to alkaline after 25 days. | No change. |
| Nitrate reducing ability | − | +. |
| Citric acid utilization | ± | −. |
| Sugar utilization: | | |
| Galactose | ± | +. |
| Trehalose | − ⟶ + | +. |
| Mannitol | ± | −. |
| Inositol | ± | −. |
| Inulin | ± | −. |

The present invention is advantageously carried out, as hereinafter described, by employing this newly isolated L-glutamic acid-producing *Corynebacterium melassecola*. As shown in Table 2, the present bacterium can accumulate a remarkable amount of L-glutamic acid in a culture medium containing fermentation inhibiting factors such as, for example, a culture medium containing waste molasses as a carbon source, or a glucose medium to which excess biotin has been added intentionally under such conditions as are described later. Therefore, with the conventional strains screened from the glucose medium, the present bacterium provides a more practical and economical process for producing L-glutamic acid, which is the most important feature of the method of this invention.

TABLE 2

Carbon source (5%) employed:     L-glutamic acid accumulated, g./dl.
    Glucose _____ 1.8
    Waste molasses:
       Without surface active agent _____ 0.08
       With surface active agent _____ 2.6

Cultivation conditions for using *Corynebacterium melassecola* are now described hereinunder. As for the culture medium employed in the method of this invention, any culture medium containing an appropriate amount of carbohydrate source utilized by said bacterium, e.g. sucrose, glucose and the like, nitrogen source and inorganic compounds may successfully be employed. Sucrose-containing molasses is especially advantageous as the principal carbohydrate source in the production of L-glutamic acid according to this invention, because said molasses is a low cost carbohydrate source and makes possible high efficiency in fermentation. However, when the sucrose-containing molasses is used, as found in the composition of aforementioned screening culture medium, a surface active agent or antibiotic having an effect similar to that of Nonion S-6 (trade name; main ingredient: polyoxyethylene monostearate), should be added to the culture medium.

Surface active agents that may be employed in the method of the invention include cationic, anionic, amphoteric, and nonionic surface active agents made of higher saturated fatty acid, alcohol and their derivatives. For example, the following compounds may advantageously be employed: polyoxyethylene monostearate, polyoxyethylene myristyl ether, polyoxyethylene monopalmitate, polyoxyethylene sorbitan monopalmitate, lauryl amine acetate, cetyl trimethyl ammonium bromide, benzalconium chloride, sodium lauryl sulfate, stearyl acid, betaine type amphoteric surface active agent, and polyoxyethylene palmityl amine. Such antibiotics as penicillin, streptomycin and the like have been satisfactory employed. The amounts and the time for addition of these materials vary widely depending on the type of the materials employed.

If a pure carbohydrate such as, for example, pure glucose is used and the biotin content in the culture medium is maintained at the suboptimal level required by the bacteria for their growth, no addition of said materials is required; however if biotin is present in an amount exceeding the suboptimal level, the bacterium must be cultured in the presence of these materials. Thus, the bacterium can be used even in the presence of an excess amount of biotin, and moreover a much higher yield can be obtained as compared with the case where a suboptimal amount of biotin is employed. This is one of the outstanding characteristics of the present bacterium.

As for a nitrogen source, various inorganic and organic nitrogen compounds such as, for example, urea, ammonium salt, ammonia, peptone, meat extract, corn steep liquor, gluten, casein, and various protein hydrolysates may be employed. An inorganic salt such as potassium salt, phosphoric acid salt and magnesium salt, and also trace elements such as manganese salt and iron salt may be added to the culture medium of this invention.

In the present invention, fermentation must be carried out under submerged aerobic conditions. A temperature of between 28° and 35° C. is preferred. The pH of the fermentation medium of the invention may range from 6 to 9, but the preferred range is around 7–8.5. Prior to this invention, it was generally believed that fermentation at around pH 7 was not as favorable for the production of L-glutamic acid as a range of 7.5 to 8.5. However, so far as the present process is concerned, fermentation at around pH 7 gives equally good results. As stated hereinabove, fermentation is usually carried out under aerobic and submerged conditions for 25–40 hours. When waste molasses is employed as the carbohydrate source, the process of this invention must be carried out in the presence of a surface active agent. In this case, the time for addition of said surface active agent may be determined by the time lapse of cultivation or by measuring the optical density (O.D.) of the culture medium. In order to determine the O.D. value, an aliquot of fermentation medium is diluted to 20 times its volume with water; the thus diluted solution is placed in a 10 mm. cell and measured by means of a photocell colorimeter at 660 m$\mu$. The value thus obtained indicates the degree of growth of bacteria, and therefore an optimum time for addition of the surface active agent may advantageously be determined by following the change in this O.D. value.

After completion of the fermentation, L-glutamic acid may be recovered from the culture medium by using a conventional isoelectric point method. For example, the culture medium is centrifuged to remove bacterial cells; the centrifuged broth is then concentrated and an acid was added to adjust the pH to 3.2; and then the medium is allowed to stand in a refrigerator until the L-glutamic acid crystals are precipitated therefrom. Other methods may be employed for separation of L-glutamic acid crystals, if desired. For example, a method for utilizing ion exchange resin or a method for recovering the product in the form of a metal salt thereof may be used.

The invention is now illustrated by the following examples.

EXAMPLE 1

Corynebacterium melassecola AS–B 2208 strain was inoculated into a seed medium having the following composition and cultured at 30° C. for 24 hours:

G./dl
Corn steep liquor _____ 4
Amino acid solution (wheat gluten hydrolyzed solution) _____ 4
Sodium chloride _____ 0.1
$KH_2PO_4$ _____ 0.1
Adjusted pH _____ 6.8

75 ml. of fermentation medium having the following composition was poured into each of a series of 500 ml. Sakaguchi flasks and sterilized. 1.5 ml. of each culture thus prepared was then inoculated into the fermentation media and the media were fermented at 30° C. for 40 hours under shaking.

The composition of the fermentation medium:

| | | |
|---|---|---|
| Glucose | g./dl. | 7 |
| Urea | g./dl. | 1.4 |
| $KH_2PO_4$ | g./dl. | 0.5 |
| $(NH_4)_2SO_4$ | g./dl. | 0.1 |
| $MgSO_4 \cdot 7H_2O$ | g./dl. | 0.05 |
| $MnSO_4 \cdot 4H_2O$ | mg./dl. | 1 |
| $ZnSO_4 \cdot 7H_2O$ | mg./dl. | 1 |
| $FeSO_4 \cdot 7H_2O$ | mg./dl. | 1 |
| Biotin | μg./dl. | 3 |
| Emanon 3115 [1] | g./dl. | 0.1 |
| Adjusted pH | | 7.2 |

[1] Trade name of Kao Soap Co.; main ingredient is polyoxyethylene monostearate.

The average amount of L-glutamic acid accumulated in these media was around 3.19 g./dl. After removing bacterial cells, 500 ml. of the combined filtrate was concentrated under reduced pressure to one sixth of the original volume, and hydrochloric acid was added to adjust the pH to 3.2. Upon filtration, 15.3 g. of crude L-glutamic acid crystalline mass was obtained.

EXAMPLE 2

A fermentation medium having the following composition was used in this example:

| | | |
|---|---|---|
| Beet waste molasses (as total sugar) | g./dl. | 7 |
| Urea | g./dl. | 1.4 |
| $KH_2PO_4$ | g./dl. | 0.2 |
| $MgSO_4 \cdot 7H_2O$ | g./dl. | 0.05 |
| $(NH_4)_2SO_4$ | g./dl. | 0.1 |
| Adjusted pH | | 7.0 |

*Corynebacterium melassecola* AS–B 4821, ATCC 17966, was precultured in a seed medium in accordance with the procedure described in Example 1. 1.5 ml. of the culture thus obtained was inoculated into each of a series of Sakaguchi flasks, each containing 75 ml. of said fermentation medium and being sterilized, and fermented under shaking. After 3 hours, 0.15 g./dl of Nonion S–6 (trade name of Nippon Yushi Co.; main ingredient is polyoxyethylene monostearate) was added to the medium, and the fermentation was further continued under shaking. After 48 hours' fermentation, 3.48 g./dl of L-glutamic acid had accumulated in the medium. Employing the same procedure as described in Example 1, 16.8 g. of crude L-glutamic crystals was obtained from 500 ml. of the fermentation broth.

Biotin content in the beet sugar waste molasses employed in this example (from North America) was at the level of 11.5 g./100 g. and the sugar content was 52 g./100 g. calculated as total sugar.

EXAMPLE 3

Media having the following compositions were used in the example:

| | Seed medium | Fermentation medium |
|---|---|---|
| Cane sugar waste molasses (as total total sugar), g./dl | 4.0 | 10 |
| $KH_2PO_4$, g./dl | 0.2 | 0.1 |
| $MgSO_4 \cdot 7H_2O$, g./dl | 0.05 | 0.05 |
| Urea, g./dl | 0.8 | 1.2 |
| Silicon, g./dl | | 0.05 |
| Tween 40,[1] g./dl | | 0.1 |
| Adusted pH | 6.8 | 7.0 |

[1] Trade name of Atlas Powder Co.; main ingredient is polyoxyethylene sorbitan monopalmitate.

*Corynebacterium melassecola* AS–B 1980 strain was cultured in a seed medium having the above composition at 30° C. for 16 hours. Fifty milliliters of the fermentation medium were poured into each of a series of Sakaguchi flasks. After sterilizing the flasks, 1 ml. portions of the culture obtained from the seed medium were inoculated into said flasks and the media in these flasks were fermented at 30° C. After 7 hours from the initiation of the fermentation, penicillin G was added to each flask in the proportion of 5 unit/ml. of antibiotic to the medium. Urea was then added to each flask in the proportion of 0.8 g./dl. after 24 hours from the initiation of fermentation, and the fermentation was continued another 24 hours. The average yield of L-glutamic acid in the medium after 48 hours was 4.8 g./dl. Treating the fermentation broth as stated in Example 1, 18.6 g. of crude L-glutamic acid crystals were obtained from 500 ml. of the broth.

The biotin content in the cane sugar waste molasses (from Java island) employed in this example was 105 g./100 g., and the sugar content was 57.6 g./100 g. as total sugar. This molasses was also employed in the examples hereinafter described.

EXAMPLE 4

A fermentation medium having the following composition was used in this example:

| | | |
|---|---|---|
| Cane sugar waste molasses (as total sugar) | g./dl. | 7 |
| Urea | g./dl. | 1.4 |
| Ammonium sulfate | g./dl. | 0.1 |
| $KH_2PO_4$ | g./dl. | 0.1 |
| $K_2HPO_4$ | g./dl. | 0.1 |
| $MgSO_4 \cdot 7H_2O$ | g./dl. | 0.05 |
| $FeSO_4 \cdot 7H_2O$ | mg./dl. | 0.5 |
| $MnSO_4 \cdot 4H_2O$ | mg./dl. | 0.5 |
| Nonion P–6 [1] | g./dl. | 0.1 |
| Adjusted pH | | 7 |

[1] Trade name of Nippon Yushi Co.; main ingredient is polyoxyethylene monopalmitate.

*Corynebacterium melassecola* AS–B 1285, ATCC 17965, was precultured in the seed medium as described in Example 3, and the culture thus obtained was inoculated into the fermentation medium and the medium was then fermented in accordance with the procedure described in Example 3. After 8 hours' fermentation under shaking, Catios BC (trade name of Miyoshi Chem. Co.; main ingredient is benzalconium chloride) was added to the medium in an amount of 0.03 g./dl. and the fermentation was further continued. The amount of L-glutamic acid accumulated in the fermentation medium reached 3.21 g./dl. after 48 hours' fermentation. Treatment of the total 500 ml. of fermentation broth as described in Example 1 gave 15.7 g. of crude L-glutamic acid crystals.

EXAMPLE 5

A fermentation medium having the following composition was used in this example:

| | | |
|---|---|---|
| Beet sugar waste molasses (as total sugar) | g./dl. | 7.0 |
| Phosphoric acid (85% purity) | g./dl. | 0.2 |
| $MgSO_4 \cdot 7H_2O$ | mg./dl. | 50 |
| Ammonium slufate | mg./dl. | 50 |
| Biotin | μg./l. | 2 |
| Adjusted pH | | 7.2 |

*Corynebacterium melassecola* AS–B 4680 strain was cultured in a seed medium as described in Example 3, and 500 ml. of the culture thus obtained was inoculated into 10 l. of the fermentation medium placed in a 20 l. jar fermentor. The fermentation was then carried out at 30° C. while stirring at 400 r.p.m. and aerating at the rate of 10 l./minute, the pH of the medium being held at 7–8 by introducing ammonia gas therein. After 4 hours from the initiation of the fermentation, 10 g. of Nonion S–6 (trade name of Nippon Yushi Co.; main ingredient is polyoxyethylene monostearate) was added. After 12 hours from the initiating of fermentation, a sugar-supplying solution containing 50 g./dl. of beet sugar waste molasses (as total sugar) was gradually added to the fermentation medium to keep the level of sugar content constant in said medium. After 48 hours fermentation, the amount of L-glutamic acid in the medium reached 8.1 g./100 ml. showing 52.1% conversion rate of the initial sugar into L-glutamic acid. Employing a conventional separation technique, 330 g. of crude L-glutamic acid crystals were obtained from 5 l. of fermentation broth.

EXAMPLE 6

The following media were employed in this example:

| Composition | Seed medium | Fermentation medium |
|---|---|---|
| Beet sugar waste molasses (as total sugar), g./dl. | 4.0 | 7.0 |
| $KH_2PO_4$, g./dl. | 0.2 | 0.2 |
| $MgSO_4 \cdot 7H_2O$, g./dl. | 0.05 | 0.05 |
| Urea, g./dl. | 0.8 | |
| $(NH_4)_2SO_4$, g./dl. | | 0.05 |
| Biotin, μg./l. | 5 | 50 |
| pH, after sterilization | 7.0 | 7.0 |

*Corynebacterium melassecola*. AS–B 1285 strain, ATCC 17965, was cultured aerobically in a seed medium shown in the above said table at 30° C. for 8 hours under submerged conditions. 400 ml. of the culture thus obtained was inoculated into 10 l. of the above said fermentation medium placed in a 20 l. jar fermentor, and the medium was fermented aerobically at 33–35° C. for 36 hours under submerged conditions. After said inoculation, the pH of the medium was maintained at 7 by introducing ammonia gas. About 5 hours from the beginning of said fermentation (initial stage of logarithmic growth period), i.e. at the time when the net O.D. value of the fermentation medium reached 0.35, 0.10 g./dl. of sterilized Nonion S–6 (trade name of Nippon Yushi Co.; main ingredient is polyoxyethylene monostearate) was added to the medium, and about one hour later therefrom, i.e. at the time when said O.D. value reached 0.65, 0.030 g./dl. of Acetamin 24 (trade name of Kao Soap Co.; main ingredient is lauryl amine acetate) was further added to the medium. Since the sugar concentration in the medium decreased to a level of less than 1.5 g./dl., a sugar-supplying solution containing 50 g./dl. of beet sugar waste molasses (as total sugar) was continuously added to the medium. After 48 hours' fermentation, the amount of L-glutamic acid accumulated in the medium reached 9.18 g./dl. Control tests employing only Nonion S–6 and only Acetamin 24 showed the accumulation of 3.94 g./dl. and 2.87 g./dl. of L-glutamic acid in the respective media. The fermentation broth thus obtained was then filtered to remove bacterial cells, the filtrate was concentrated from 12 l. to about 3 l., and hydrochloric acid was added to adjust the pH to 3.2. By using the so-called isoelectric point method, 935 g. of crude L-glutamic acid crystals were obtained.

EXAMPLE 7

Employing the same procedure as described in Example 6, *Corynebacterium melassecola* AS–B 4820 strain was cultured in the media having the same compositions as used in the Example 6. In this example, 0.10 g./dl. of Emulgen 120 (trade name of Kao Soap Co.; main ingredient is polyoxyethylene lauryl ether) was added to the fermentation medium at the time when the net O.D. value of the medium reached 0.30, and 0.025 g./dl. of Cation MA (trade name of Nippon Yushi Co.; main ingredient is myristyl amine acetate) was added at the time when the O.D. value reached 0.70, respectively. After 36 hours' fermentation, the amount of L-glutamic acid accumulated in the culture medium reached 7.79 g./dl.

EXAMPLE 8

Employing the same procedure as described in Example 6, *Corynebacterium melassecola* AS–B 1285, ATCC 17965, was cultured in a seed medium having the following composition:

| Composition | Seed medium | Fermentation medium |
|---|---|---|
| Cane sugar waste molasses (as 100% sugar), g./dl. | 4.0 | 7.0 |
| Urea, g./dl. | 0.8 | |
| $KH_2PO_4$, g./dl. | 0.2 | 0.2 |
| $MgSO_4 \cdot 7H_2O$, g./dl. | 0.05 | 0.05 |
| $(NH_4)_2SO_4$, g./dl. | | 0.05 |
| pH, after sterilization | 7.0 | 7.0 |

The culture thus obtained was then inoculated into the fermentation medium shown above and said medium was fermented as described in the preceding Example 6. However, in this example, 0.10 g./dl. of Nonion P–6 (trade name of Nippon Yushi Co.; main ingredient is polyoxyethylene monopalmitate) was added to the medium when the O.D.=0.30, and 0.035 g./dl. Cation MA (trade name of Nippon Yushi Co.; main ingredient is myristyl amine acetate) at the time the O.D.=0.65. When the sugar content of the fermentation medium dropped to 2 g./dl. or below, a sugar-supplying solution containing 50 g./dl. (as total sugar) of cane sugar waste molasses was gradually added to the medium so as to hold the sugar content of the medium at a level of 1–2 g./dl. After 36 hours' fermentation, the amount of L-glutamic acid accumulated in the medium reached 8.86 g./dl.

EXAMPLE 9

*Corynebacterium melassecola* AS–B 4821, ATCC 17966, was cultured in the same way as described in Example 8 by using a jar fermentor. In this example, 0.10 g./dl. of Nonion P–6 (trade name of Nippon Yushi Co.; main ingredient is polyoxyethylene monopalmitate) was added to the fermentation medium when the O.D.=0.35, and 0.10 g./dl. of Nimine P–225 (trade name of Nippon Yushi Co.; main ingredient is polyoxyethylene palmityl amine) when the O.D.=0.65. After 36 hours' fermentation, the amount of L-glutamic acid accumulated in the fermentation medium reached 7.54 g./dl.

EXAMPLE 10

According to the procedure described in Example 8, *Corynebacterium melassecola* AS–B 4821, ATCC 17966, was cultured in a seed medium at 30° C. for 8 hours. Four hundred milliliters of the culture thus obtained were then inoculated into 10 l. of the sterile fermentation medium in a 20 l. jar fermentor, and the medium was fermented aerobically at 33–35° C. for 36 hours under submerged conditions while keeping the pH of said medium at 7.0 by introducing ammonia gas therein. 0.05 g./dl. of Nimine M–225 (trade name of Nippon Yushi Co.; main ingredient is polyoxyethylene myristyl amine) was added to the fermentation medium when the net O.D. value of the medium reached 0.30 (i.e. the initial stage of logarithmic growth period of bacteria), and 0.10 g./dl. of the same surface active agent when the O.D.=0.65 (i.e. the middle stage of logarithmic growth period of bacteria). After 36 hours' fermentation, the amount of L-glutamic acid accumulated in the medium reached 7.41 g./dl. The fermentation broth thus obtained was then centrifuged to remove bacterial cells therefrom, the centrifuged broth was concentrated from 12 l. to about 3 l., and hydrochloric acid was added to adjust the pH to 3.2 to precipitate L-glutamic acid crystals. Upon filtration, 860 g. of crude L-glutamic acid crystals were obtained.

What we claim is:
1. A process for producing L-glutamic acid by fermentation comprising the steps of: preparing a fermentation medium containing carbohydrate, a nitrogen source and inorganic salts, inoculating said medium with *Corynebacterium melassecola*, fermenting said medium in the presence of at least one member selected from the group consisting of surface active agents and antibiotics under aerobic submerged conditions, and recovering the L-glutamic acid thus produced from said medium.

2. A process for producing L-glutamic acid by fermentation according to claim 1, wherein said carbohydrate is waste molasses.

3. A process for producing L-glutamic acid by fermentation according to claim 1 wherein said surface active agent is selected from the group consisting of polyoxyethylene monostearate, polyoxyethylene sorbitan monopalmitate, polyoxyethylene monopalmitate, polyoxyethylene lauryl ether, alkyl betaine type amphoteric surface active agent, lauryl alcohol sulfuric acid ester, and benzalconium chloride, polyoxyethylene myristil ether, lauryl amine acetate, cetyl trimethyl ammonium bromide, sodium lauryl sulfate, stearyl acid, polyoxyethylene palmityl amine, penicillin, and streptomycin.

4. A process for producing L-glutamic acid by fermentation according to claim 1, wherein said antibiotic is penicillin.

5. A process for producing L-glutamic acid by fermentation according to claim 1, wherein said fermentation is carried out at a temperature of between 28 and 35° C.

6. A process for producing L-glutamic acid by fermentation according to claim 1, wherein said fermentation is carried out at a pH of 7.0–8.5.

7. A process for producing L-glutamic acid by fermentation according to claim 1, further comprising the steps of isolating said *Corynebacterium melassecola* from soils and drains, using a screening medium of the following composition:

| | G./dl. |
|---|---|
| Beet sugar waste molasses (as 100% sugar) | About 7.0 |
| Urea | About 1.5 |
| KH$_2$PO$_4$ | About 1.5 |
| (NH$_4$)$_2$SO$_4$ | About 0.1 |
| MgSO$_4$·7H$_2$O | About 0.05 |
| Nonion S–6 | About 0.13 |

8. A process for producing L-glutamic acid by fermentation according to claim 1, said carbohydrate being sucrose containing molasses and said surface active agent being selected from the group consisting of cationic, anionic, amphoteric, and nonionic surface active agents made of higher saturated fatty acid, alcohol and their derivatives, polyoxyethylene monostearate, polyoxyethylene myristil ether, polyoxyethylene monopalmitate, polyoxyethylene sorbitan monopalmitate, lauryl amine acetate, cetyl trimethyl ammonium bromide, benzalconium chloride, sodium lauryl sulfate, stearyl acid, betaine type amphoteric surface active agent, polyoxyethylene palmityl amine, penicillin and streptomycin.

9. A process for producing L-glutamic acid by fermentation according to claim 1, including the step of maintaining the biotin content at a suboptimal level required for the growth of the bacteria, said carbohydrate being employed in pure form and omitting the addition of said member selected from said group consisting of surface active agents and antibiotics.

10. A process for producing L-glutamic acid by fermentation according to claim 1, further including the step of maintaining the biotin content at an amount exceeding the suboptimal level required by the bacteria for its growth.

11. A process for producing L-glutamic acid by fermentation according to claim 1, said nitrogen source selected from the group consisting of urea, ammonium salt, ammonia, peptone, meat extract, corn steep liquor, gluten, casein, and protein hydrolysates.

12. A process for producing L-glutamic acid by fermentation according to claim 1, said inorganic salt selected from the group consisting of potassium salt, phosphoric acid salt, magnesium salt, manganese salt and iron salt.

13. A process for producing L-glutamic acid by fermentation according to claim 1, said step of fermentation being carried out under submerged aerobic conditions at a temperature of between 28° and 35° C., the pH of the fermentation medium of the invention ranging from 6 to 9.

14. A process for producing L-glutamic acid by fermentation according to claim 1, said carbohydrate being waste molasses and the time for adding said surface active agent being determined by the time lapse of cultivation.

15. A process for producing L-glutamic acid by fermentation according to claim 1, said carbohydrate being molasses and the time lapse for adding the said surface active agent being determined by measuring the optical density of the culture medium and following the change in its value.

16. A process for producing L-glutamic acid by fermentation according to claim 1, said step of recovering the L-glutamic acid being by an isoelectric point method.

17. A process for producing L-glutamic acid by fermentation according to claim 1, said step of recovering the L-glutamic acid being by the ion exchange resin method.

18. A process for producing L-glutamic acid by fermentation according to claim 1, said step for recovering the L-glutamic acid being by the method of producing a metal salt thereof.

19. A process for producing L-glutamic acid by fermentation according to claim 1, said *Corynebacterium melassecola* being of the AS–B2208 strain inoculated into a seed medium having the following composition:

| | | |
|---|---|---|
| Corn steep liquor | g./dl. | about 4 |
| Amino acids solution (wheat gluten hydrolyzed solution) | g./dl. | about 4 |
| Sodium chloride | g./dl. | about 0.1 |
| KH$_2$PO$_4$ | g./dl. | about 0.1 |
| Adjusted pH | | 6.8 | said fermentation medium having the following composition:

| | | |
|---|---|---|
| Glucose | g./dl. | about 7 |
| Urea | g./dl. | about 1.4 |
| KH$_2$PO$_4$ | g./dl. | about 0.5 |
| (NH$_4$)$_2$SO$_4$ | g./dl. | about 0.1 |
| MgSO$_4$·7H$_2$O | g./dl. | about 0.05 |
| MnSO$_4$·H$_2$O | mg./dl. | about 1 |
| ZnSO$_4$·7H$_2$O | mg./dl. | about 1 |
| FeSO$_4$·7H$_2$O | mg./dl. | about 1 |
| Biotin | µg./dl. | about 3 |
| Polyoxyethylene monostearate | g./dl. | about 0.1 |

20. A process for producing L-glutamic acid by fermentation according to claim 1, said *Corynebacterium melassecola* being of the AS–B 4821, ATCC 17966 strain precultured into a seed medium having the following composition and cultured at 30° C. for 24 hours:

| | | |
|---|---|---|
| Corn steep liquor | g./dl. | about 4 |
| Amino acid solution (wheat gluten hydrolyzed solution) | g./dl. | about 4 |
| Sodium chloride | g./dl. | about 0.1 |
| KH$_2$PO$_4$ | g./dl. | about 0.1 |
| Adjusted pH | | 6.8 | said fermentation medium having the following composition:

| | G./dl. |
|---|---|
| Beet waste molasses (as total sugar) | about 7 |
| Urea | about 1.4 |
| KH$_2$PO$_4$ | about 0.2 |
| MgSO$_4$·7H$_2$O | about 0.05 |
| (NH$_4$)$_2$SO$_4$ | about 0.1 |
| Adjusted pH | 7.0 |

21. A process for producing L-glutamic acid by fermentation according to claim 1, said *Corynebacterium melassecola* being of the AS–B 1980 strain cultured in a seed medium and subsequently inoculated into a fermentation medium of the following compositions:

| | Seed medium | Fermentation medium |
|---|---|---|
| Cane sugar waste molasses (as total sugar). | About 4.0 g./dl | About 10 g/dl. |
| KH₂PO₄ | About 0.2 g./dl | About 0.1 g/dl. |
| MgSO₄·7H₂O | About 0.05 g./dl | About 0.05 g/dl. |
| Urea | About 0.8 g./dl | About 1.2 g/dl. |
| Silicon | | About 0.05 g/dl. |
| Polyoxyethylene sorbitan monopalmitate. | | About 0.1 g/dl. |
| Adjusted pH | 6.8 | 7.0 |

22. A process for producing L-glutamic acid by fermentation according to claim 1, said *Corynebacterium melassecola* being of the strain AS–B 1285, ATCC 17965 precultured in a seed medium of the following composition:

| | Seed medium | Fermentation medium |
|---|---|---|
| Cane sugar waste molasses (as total sugar). | About 4.0 g./dl | About 10 g./dl. |
| KH₂PO₄ | About 0.2 g./d | About 0.1 g./dl. |
| MgSO₄·7H₂O | About 0.05 g./dl | About 0.05 g./dl. |
| Urea | About 0.8 g./dl | About 1.2 g./dl. |
| Silicon | | About 0.05 g./dl. |
| Polyoxyethylene sorbitan monopalmitate. | | About 0.1 g./dl. |
| Adjusted pH | 6.8 | 7.0 | said fermentation medium having the following composition:

Cane sugar waste molasses (as total sugar)
g./dl__ about 7
Urea _____ g./dl__ about 1.4
Ammonium sulfate _____ g./dl__ about 0.1
KH₂PO₄ _____ g./dl__ about 0.1
K₂HPO₄ _____ g./dl__ about 0.1
MgSO₄·7H₂O _____ g./dl__ about 0.05
FeSO₄·7H₂O _____ mg./dl__ about 0.5
MnSO₄·4H₂O _____ mg./dl__ about 0.5
Polyoxyethylene monopalmitate ____ g./dl__ about 0.1
Adjusted pH _____ 7

23. A process for producing L-glutamic acid by fermentation according to claim 1, said *Corynebacterium melassecola* being of the strain AS–B 4680, cultured in a seed medium of the following composition:

| | Seed medium | Fermentation medium |
|---|---|---|
| Cane sugar waste molasses (as total sugar). | About 4.0 g./dl | About 10 g./dl. |
| KH₂PO₄ | About 0.2 g./dl | About 0.1 g./dl. |
| MgSO₄·7H₂O | About 0.05 g./dl | About 0.05 g./dl. |
| Urea | About 0.8 g./dl | About 1.2 g./dl. |
| Silicon | | About 0.05 g./dl. |
| Polyoxyethylene sorbitan monopalmitate. | | About 0.1 g./dl. |
| Adjusted pH | 6.8 | 7.0 | said fermentation medium having the following composition:

Beet sugar waste molasses (as total sugar)
g./dl__ about 7.0
Phosphoric acid (85% purity) _____ g./dl__ about 0.2
MgSO₄·7H₂O _____ mg./dl__ about 50
Ammonium sulfate _____ mg./dl about 50
Biotin _____ μg./l__ about 2
Adjusted pH _____ 7.2

24. A process for producing L-glutamic acid by fermentation according to claim 1, said *Corynebacterium melassecola* being of the strain AS–B 1285, ATCC 17965 cultured at about 30° C. for about 8 hours under submerged conditions aerobically in a seed medium and subsequently inoculated for fermentation aerobically at about 33–35° C. for about 36 hours under submerged conditions into a fermentation medium of the following composition:

| Composition | Seed medium | Fermentation medium |
|---|---|---|
| Beet sugar waste molasses (as total sugar). | About 4.0 g./dl | About 7.0 g./dl. |
| KH₂PO₄ | About 0.2 g./dl | About 0.2 g./dl. |
| MgSO₄·7H₂O | About 0.05 g./dl | About 0.05 g./dl. |
| Urea | About 0.8 g./dl | |
| (NH₄)₂SO₄ | | About 0.05 g./dl. |
| Biotin | About 5 μg./l | About 50 μg./l. |
| pH, after sterilization | 7.0 | 7.0. | further comprising the steps of adding to said fermentation medium after about 5 hours from the beginning of said fermentation (initial stage of logarithmic growth period), i.e. at the time when the net O.D. value of the fermentation reaches 0.35, 0.10 g./dl of polyoxyethylene monostearate, about one hour later, i.e. at the time when said O.D. value reaches 0.65, 0.030 g./dl. of lauryl amine acetate, and maintaining the sugar concentration at a level of at least 1.5 g./dl., by continuously adding a sugar-supplying solution containing 50 g./dl. of beet sugar waste molasses (as total sugar).

25. A process for producing L-glutamic acid by fermentation according to claim 1, said *Corynebacterium melassecola* culture being of the strain AS–B 4820, precultured in a medium having the following composition:

| Composition | Seed medium | Fermentation medium |
|---|---|---|
| Beet sugar waste molasses (as total sugar). | About 4.0 g./dl | About 7.0 g./dl. |
| KH₂PO₄ | About 0.2 g./dl | About 0.2 g./dl. |
| MgSO₄·7H₂O | About 0.05 g./dl | About 0.05 g./dl. |
| Urea | About 0.8 g./dl | |
| (NH₄)₂SO₄ | | About 0.05 g./dl. |
| Biotin | About 5 μg./l | About 50 μg./dl. |
| pH, after sterilization | 7.0 | 7.0. | and adding to said fermentation medium polyoxyethylene lauryl ether about 0.10 g./dl. at the time when the net O.D. value of the medium reached 0.30, and 0.025 g./dl. of myristyl amine acetate at the time when the O.D. value reached 0.70, respectively, whereby after 36 hours of fermentation the amount of L-glutamic acid accumulated in the culture medium reached about 7.79 g./dl.

26. A process for producing L-glutamic acid by fermentation according to claim 1, said *Corynebacterium melassecola* being of the strain AS–B 1285, ATCC 17965 cultured in a seed medium and inoculated into a fermentation medium, having the following compositions:

| Composition | Seed medium | Fermentation medium |
|---|---|---|
| Cane sugar waste molasses (as 100% sugar). | About 4.0 g./dl | About 7.0 g./dl. |
| Urea | About 0.8 g./dl | |
| KH₂PO₄ | About 0.2 g./dl | About 0.2 g./dl. |
| MgSO₄·7H₂O | About 0.05 g./dl | About 0.05 g./dl. |
| (NH₄)SO₄ | | About 0.05 g./dl. |
| pH, after sterilization | 7.0 | 7.0. | further comprising the steps of adding to said fermentation medium about 0.10 g./dl. polyoxyethylene monopalmitate when the O.D.=0.30, and 0.035 g./dl. myristyl amine acetate at the time the O.D.=065 and maintaining the sugar content of the fermentation medium at about 1–2 g./dl. by adding a sugar-supplying solution containing 50 g./dl. of sugar for about 36 hours.

27. A process for producing L-glutamic acid by fermentation according to claim 1, said *Corynebacterium melassecola* culture being of the strain AS–B 4821, ATCC 17966, cultured in a seed medium having the following composition:

| Composition | Seed medium | Fermentation medium |
|---|---|---|
| Cane sugar waste molasses (as 100% sugar). | About 4.0 g./dl | About 7.0 g./dl. |
| Urea | About 0.8 g./dl | |
| $KH_2PO_4$ | About 0.2 g./dl | About 0.2 g./dl. |
| $MgSO_4 \cdot 7H_2O$ | About 0.05 g./d | About 0.05 g./d. |
| $(NH_4)_2SO_4$ | | About 0.05 g./dl. |
| pH, after sterilization | 7.0 | 7.0. | further comprising the step of adding 0.10 g./dl. of polyoxyethylene monopalmitate to the fermentation medium when the O.D.=0.35, and 0.10 g./dl. of polyoxyethylene palmityl amine when the O.D.=0.65, whereby after 36 hours' fermentation, the amount of L-glutamic acid accumulated in the fermentation medium reached 7.54 g./dl.

28. A process for producing L-glutamic acid by fermentation according to claim 1, said *Corynebacterium melassecola* culture being of the strain AS–B 4821, ATCC 17966, cultured in a seed medium at 30° C. for 8 hours, the culture thus obtained inoculated into sterile fermentation medium, said medium fermented aerobically at 33–35° C. for 36 hours under submerged conditions while keeping the pH of said medium at 7.0, further comprising the steps of adding 0.05 g./dl. of polyoxyethylene myristyl amine to the fermentation medium when the net O.D. value of the medium reaches 0.30 (i.e. the initial stage of logarithmic growth period of bacteria), and 0.10 g./dl. of the said surface active agent when the O.D.=0.65 (i.e. the middle stage of logarithmic growth period of bacteria). After 36 hours' fermentation, the amount of L-glutamic acid accumulated in the medium reached 7.41 g./dl.

No references cited.

A. LOUIS MONACELL, *Primary Examiner.*

L. M. SHAPIRO, *Assistant Examiner.*